(12) United States Patent
Kanda et al.

(10) Patent No.: US 7,321,814 B2
(45) Date of Patent: Jan. 22, 2008

(54) VEHICLE CONDITION MONITORING SYSTEM

(75) Inventors: Yasushi Kanda, Kariya (JP); Noriaki Terashima, Okazaki (JP); Tatsuya Katou, Nagoya (JP)

(73) Assignee: DENSO CORPORATION, Kariya (JP)

( * ) Notice: Subject to any disclaimer, the term of this patent is extended or adjusted under 35 U.S.C. 154(b) by 211 days.

(21) Appl. No.: 11/142,476

(22) Filed: Jun. 2, 2005

(65) Prior Publication Data

US 2005/0283286 A1    Dec. 22, 2005

(30) Foreign Application Priority Data

Jun. 16, 2004   (JP)   ............... 2004-178902
Aug. 6, 2004    (JP)   ............... 2004-230846

(51) Int. Cl.
   *G01C 21/00*  (2006.01)
(52) U.S. Cl. ........................... 701/29; 340/571
(58) Field of Classification Search ............. 701/29, 701/35, 70, 93, 119, 117; 340/571, 572.1, 340/457, 825.69, 825.72; 342/458, 463
   See application file for complete search history.

(56) References Cited

U.S. PATENT DOCUMENTS

| | | | |
|---|---|---|---|
| 5,079,538 A * | 1/1992 | DeFino et al. ......... | 340/426.17 |
| 6,253,129 B1 * | 6/2001 | Jenkins et al. ............... | 701/29 |
| 6,606,562 B1 * | 8/2003 | Gifford ...................... | 701/213 |
| 6,714,132 B2 * | 3/2004 | Edwards et al. ......... | 340/573.1 |
| 6,865,457 B1 * | 3/2005 | Mittelsteadt et al. ......... | 701/35 |
| 6,927,685 B2 * | 8/2005 | Wathen .................. | 340/539.1 |
| 2002/0128769 A1 * | 9/2002 | Der Ghazarian et al. ... | 701/207 |
| 2003/0095040 A1 * | 5/2003 | Shimomura ............ | 340/426.13 |

FOREIGN PATENT DOCUMENTS

| | | |
|---|---|---|
| JP | A-H08-270285 | 10/1996 |
| JP | 2004-216290 | 7/2004 |

\* cited by examiner

*Primary Examiner*—Dalena Tran
(74) *Attorney, Agent, or Firm*—Posz Law Group, PLC

(57) ABSTRACT

A vehicle condition monitoring system for an unattended vehicle includes an initial setting storage means, an actual state detection means, a comparison means, and a reporting means. The initial setting storage means memorizes a predetermined initial setting of a vehicle, that is, a window setting, a light setting, a door lock setting and the like. The actual state detection means detects an actual state of the vehicle. The comparison means compares the initial setting and the actual state of the vehicle. The reporting means issues a report that identifies the existence of a difference between the actual state of the vehicle and the initial setting based on a result of a comparison. A portable device receives the report through a wireless communication system.

18 Claims, 7 Drawing Sheets

VEHICLE CONDITION MONITORING SYSTEM

CROSS REFERENCE TO RELATED APPLICATION

This application is based on and claims the benefit of priority of Japanese Patent Application No. 2004-178902 filed on Jun. 16, 2004 and Japanese Patent Application No. 2004-230846 filed on Aug. 6, 2004, the disclosure of which is incorporated herein by reference.

FIELD OF THE INVENTION

The present invention generally relates to a vehicle condition monitoring system.

BACKGROUND OF THE INVENTION

A conventional keyless entry system, that is, a system for remotely controlling a door lock, uses a portable device attached to a key to transmit a control signal to a control unit for locking/unlocking a door on a vehicle. The portable device enables a user of the vehicle to lock/unlock the door without inserting the key in a key cylinder.

A modified type of the keyless entry system, that is, a so-called smart entry system, automatically sends out a signal from the portable device to the control unit to unlock the door on the vehicle (refer to a Japanese Patent Document JP-A-H8-270285). In this case, the portable device automatically responds to a detection signal from the control unit on the vehicle, when the portable device reaches within a certain distance from the control unit. A door lock actuator receives a response from the portable device to unlock the door without having an explicit instruction from a user of the vehicle, i.e., a holder of the portable device. In this manner, the modified type of the keyless entry system facilitates a convenience of the user.

Further, a couple of additional features are added to this kind of entry system. For example, the door lock being unlocked when the user touches on a handle, the door lock locked by a press on a button on the handle, a door mirror lamp being lit by itself, a trunk lid opened by a press on a button on the lid, an engine turned on by a press on an ignition switch, and a security system released upon exchange of an ID between the key and the vehicle, are among the features available for the user when he/she approaches the vehicle with the portable device of the smart entry system. In this manner, the user is free from a trouble such as searching the key in a purse and inserting it in a key slot or pressing a button on the portable device for sending an unlock signal. A vehicle equipped with this kind of features is already available.

However, the smart key system does not necessarily improve the convenience of the user when the operation of the portable device is too complicated or an indicator of the device is ambiguous. Further, a confused user sometimes misuses those features to leave the vehicle in a decreased security condition, that is, the user leaves the vehicle in an unlocked condition. Those features also contribute to an increase of battery consumption.

A preventive measure for warning a mis-operation or a lack of operation is already devised in vehicles equipped with the smart entry system. For example, an inconvenience such as a half-shut door and/or a half-released parking brake of a traveling vehicle, or a key or an operating headlight on an unattended vehicle is warned by using an indicator disposed on an instrument panel or a buzzer.

However, the user sometimes fails to respond to the warning because of disturbance of an environment such as a noise or the like. In addition, some user who habitually parks the vehicle in an unlocked condition may feel it a "misplaced warning" when he/she is warned that the vehicle is left unlocked or the like.

Further, the indicator or the buzzer is only effective to the user in a proximity of the vehicle. For example, the vehicle parked away from home will be left unlocked when the user does not notice the warning at the time of departing from the vehicle parked in a parking space.

SUMMARY OF THE INVENTION

In view of the above-described problems, it is an object of the present invention to provide a vehicle condition monitoring system that suitably operates according to a parking habit of a user of a vehicle.

The initial setting of the parked vehicle in a parking space is memorized in the vehicle condition monitoring system as a criterion for comparison. That is, a position of a window, a switch of a light, a state of a door lock and the like are memorized as an initial setting. An actual state of the vehicle is also memorized. The actual state of the vehicle is compared to the initial setting for sending out an abnormal signal. The abnormal signal is used for informing the user of a condition of the vehicle based on a comparison between the actual state and the initial setting. The abnormal signal is sent out by using a reporting means. The abnormal signal is received by a portable device through a wireless communication network.

The vehicle condition monitoring system includes an initial setting storage function, an actual state detection function, a comparison function, and a reporting function besides the portable device.

The portable device is, in this case, a cell phone or the like. Therefore, the vehicle condition monitoring system can be applied for a vehicle in a parking space that is well apart from a house of the user. That is, the user of the vehicle parked far away from the house can be warned about a lack of a lock operation by the vehicle condition monitoring system as long as the parking space is in a communication area of a cell phone service.

The vehicle condition monitoring system may be equipped with a time keeping function that keeps an elapsed time since the vehicle is parked. The vehicle condition monitoring system may send the warning after a predetermined period of time of parking. In this manner, an annoying or misplaced warning while unloading luggage or picking up a leftover luggage just after parking is avoided. This function contributes to a reliability of the vehicle condition monitoring system by preventing a false abnormal signal while the user is still staying around the vehicle.

The vehicle condition monitoring system may be equipped with a user detection function that detects the user of the vehicle in a proximity of the vehicle. The vehicle condition monitoring system warns the user only when the user is not detected in the proximity of the vehicle. In this manner, the user of the vehicle staying close to the vehicle for a rest in a parking area of a highway, for example, is not warned by the abnormal signal. This function contributes to a reliability of the vehicle condition monitoring system by avoiding a false abnormal signal while the user is staying around the vehicle.

The vehicle condition monitoring system may include an initial setting arrangement function that allows the user of the vehicle to determine the initial setting of the vehicle stored in the initial setting storage means. This function may make the initial setting stored in the initial setting storage means suitable to an actual parking manner by the user of the vehicle. Therefore, a misplaced warning for a user who, for example, intentionally parks the vehicle unlocked is avoided.

The vehicle condition monitoring system may include an actual state detection function and an initial setting auto-arrangement function. The actual state detection function stores the actual state of the parked vehicle, and the initial setting auto-arrangement function automatically arranges the initial setting of the parked vehicle based on a history of the actual states in the past. These functions may save the user a setting operation for setting the initial setting of the parked vehicle. These functions also contribute to a situation such as a change of the parking space location because of a house-move or the like.

The vehicle condition monitoring system may have the initial setting arrangement function in either of an automotive device on the parked vehicle, the portable device or a relay station of the wireless communication network. The initial setting arrangement function available in one of those devices or station may allow the user to set the initial setting of the parked vehicle remotely when he/she is apart from the vehicle.

The vehicle condition monitoring system may have the initial setting storage function and the actual state detection function in the automotive device installed on the parked vehicle. These functions may allow the user of the vehicle to set or change the initial setting by using the portable device or the relay station of the wireless communication network. A change or a new setting of the initial setting may securely be stored in the vehicle condition monitoring system on the vehicle, and the change or the new setting may promptly be reflected on the initial setting and may promptly be used for comparison with the actual state. These functions installed on the vehicle may also contribute to a quick and reliable detection of the actual state of the vehicle.

The vehicle condition monitoring system may store the initial setting that includes information on a time slot during which the initial setting is used for comparison. The initial setting is stored in the initial setting storage means, and is retrieved for comparison with the actual state of the vehicle during the time that corresponds to the time slot specified in the initial setting. This function allows the user to set and use plural initial settings for different time slots. Different initial settings may suitably accommodate different actual states according to the time slots specified in the initial settings.

The vehicle condition monitoring system may include a location detection means for detecting a current location of the parked vehicle, and the location detected by the location detection function is included in the initial setting that is stored in the initial setting storage function. An initial setting is used for comparison when the location in the initial setting matches the current location of the parked vehicle. Plural initial settings may be prepared to accommodate different locations, each of which demands a different initial setting. For example, a parking space in a work place and a parking space at home may be different in terms of the initial setting of the parked vehicle.

The vehicle condition monitoring system may include a plurality of lock functions, a lock ID storage function, a lock ID transfer function, a lock ID receiving function, an output device storage function and a portable device selection function. The lock function installed on the door locks and unlocks the door of the parked vehicle, the lock ID storage function stores a lock ID for identifying the lock function, the lock ID sending function sends the lock ID to the automotive device on the parked vehicle, and the lock ID receiving function installed on the automotive device receives the lock ID. Then, the lock ID is stored in the output device storage function, and is used by the portable device selection function for choosing one of the portable devices as a destination of the abnormal signal. In this manner, plural portable devices may be memorized using the lock IDs, and the destination of the abnormal signal sent by the reporting function may be variably chosen according to different situations. This contributes to an improved convenience of the user of the parked vehicle.

The vehicle condition monitoring system may include a record function for storing usage of the lock ID. The portable device selection function specifies the portable device that corresponds to a latest entry in the record function as a destination of the abnormal signal sent out by the reporting function. In this manner, the portable devices used for unlocking the vehicle for the last time may be specified as the destination of the abnormal signal sent out by the reporting function. That is, the abnormal signal comes to the portable device that operated the lock means for the last time. In other words, the abnormal signal is transferred to a person who operated (unlocked) the lock function on the latest occasion. That is, only a user of the vehicle who opened the lock most recently receives the signal. This prevents a misplaced abnormal signal.

The vehicle condition monitoring system may include a portable device location detection function, a location retrieval function, a location storage function and a distance calculation function. The portable device location detection function detects a location of the portable device, and the location retrieval function retrieves a location of the portable device detected by the portable device location detection function. The location storage function stores a locational information of the portable device, and the distance calculation function calculates a distance between a current location of the vehicle and the retrieved location of the portable device. The portable device selection function selects the portable device that is closest to the vehicle as the destination of the abnormal signal sent out by the reporting function. In this manner, the user who is closest to the vehicle may receive the abnormal signal, and thus the condition of the vehicle may quickly be checked for taking a proper action or the like. This may contribute to decrease of a risk of vehicle theft.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

A vehicle condition monitoring system is explained with reference to drawings.

The object of the present invention, that is, reporting a parking condition of a vehicle being monitored in a suitable manner for a user of the vehicle, is achieved by reporting a condition based on a comparison between an arbitrarily-established initial setting and an actual state of the vehicle.

First Embodiment

Figure 1:
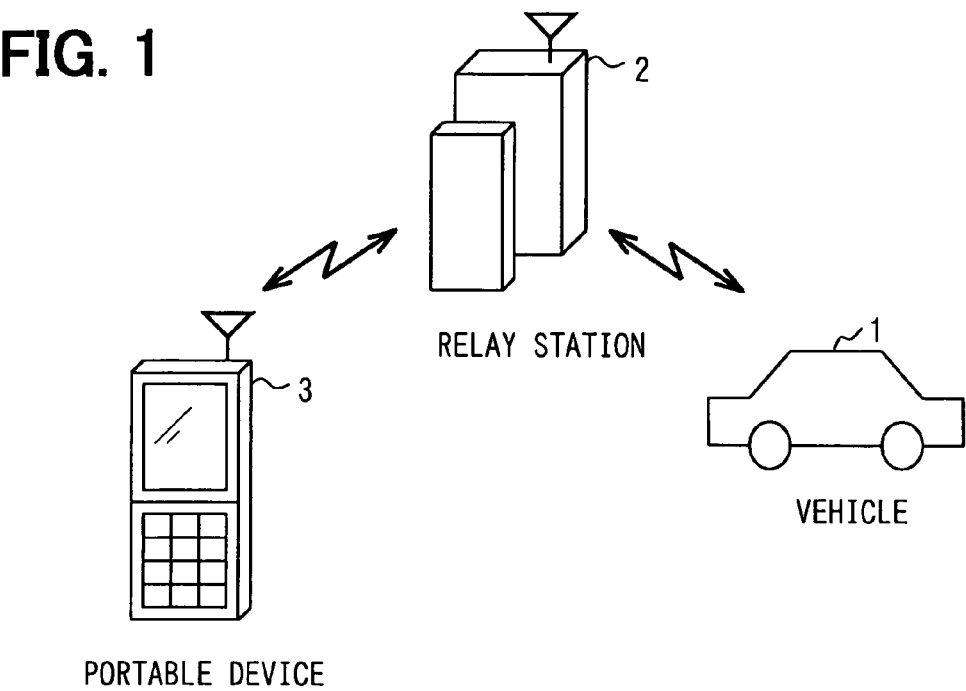
FIG. 1 is a schematic diagram that illustrates an embodiment of a vehicle condition monitoring system in the present invention.

The vehicle condition monitoring system shown in FIG. 1 includes a vehicle 1 and a portable device 3. The portable device 3 in this embodiment is represented as a cell phone of a well-known type. The portable device 3 may also be a personal computer, a personal digital assistant, a transmitter (i.e., a key) of a wireless door lock having a reception function or any other device that is equipped with a communication function.

The automotive device 10 installed on the vehicle 1 is explained with reference to FIG. 2. The automotive device 10 includes an ECU (Electric Control Unit) 11 and a data communication device 16. The ECU 11 includes various components (not shown in the figure) such as a CPU, a ROM, a RAM of well-known types, an I/O circuit, a bus line, a signal circuit for switch/sensor 17, an operation panel 18, an indicator LED 13, a buzzer 14 and a signal output circuit of a motor 15. The CPU is controlled by a program and data stored in the ROM and the RAM. The ROM has a program storage area and a data storage area. The program storage area stores a control program, and the data storage area stores data for operating the control program. The control program uses a work memory on the RAM as a work area.

The ECU 11 includes a memory 12, and the memory 12 stores information necessary for operating the ECU 11. The content of the memory 12 is retained even when an ignition switch (not shown in the figure) of the vehicle 1 is turned off.

The operation panel 18 is, for example, corresponds to a touch panel or a mechanical switch integrated with a display device that is made from a color liquid crystal display. The touch panel has infrared sensors on the display panel that uses fine meshes of infrared beams to detect a finger or a touch pen on the panel. Two dimensional coordinates (x, y) are output when the finger or the touch pen intercepts the infrared beam. The touch panel may be substituted by a pointing device such as a mouse, a cursor or the like. The operation panel 18 accepts various kinds of instruction. A microphone or a voice recognition device of a well-known type may be used for accepting a voice input.

The switch/sensor 17 includes the following components that are not shown in the figure. A door condition detection switch for detecting a door condition turns on when the door is open, and turns off when the door is closed. A door lock condition switch for determining a door lock condition turns on when the door is locked, and turns off when the door is unlocked. A window condition detection sensor for detecting a window condition translates a condition of the window into a voltage. For example, a full open window condition is translated to an output of a voltage of 5V, and a width of an opening of the window correlates to the voltage. When the window is closed, the voltage is 0. A lamp condition detection switch is used for detecting a condition of an external lamp on the vehicle. ON/OFF conditions of a headlight, a tail lamp and the like are detected by the lamp condition detection switch. A room lamp condition detection switch is used for detecting a condition of an internal lamp on the vehicle. ON/OFF conditions of a room lamp and the like are detected by the room lamp condition detection switch.

Figure 6A:
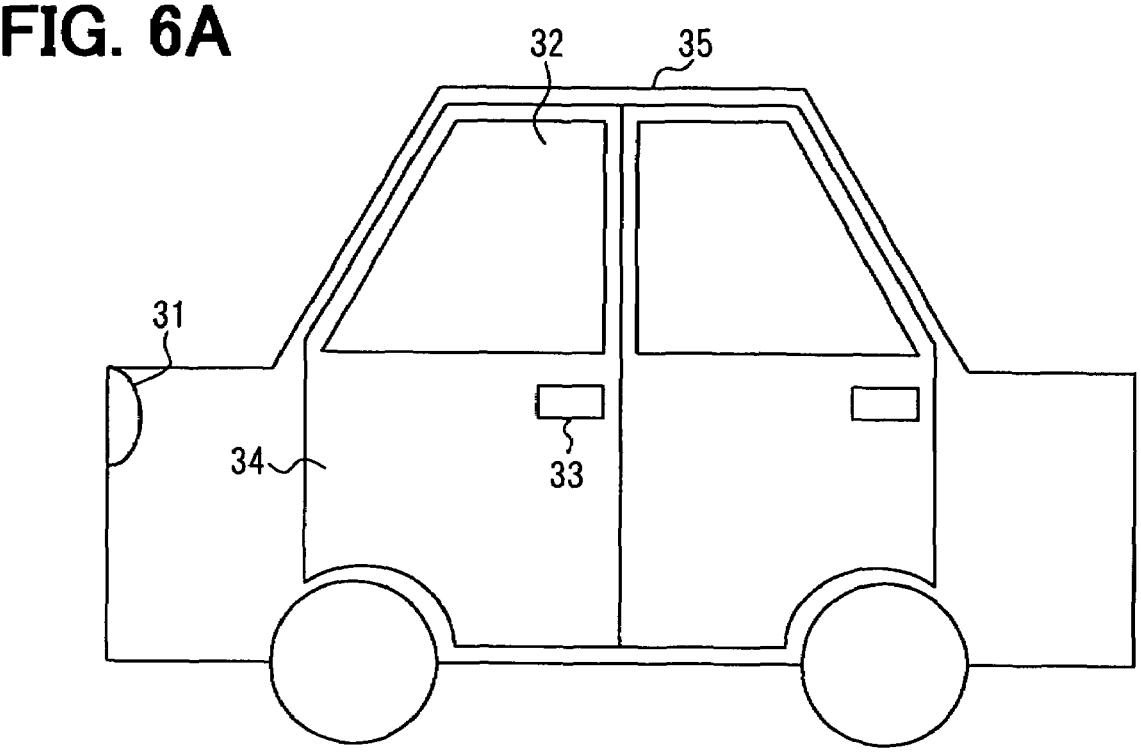
FIG. 6A is an image on a display panel for an initial setting arrangement.
Figure 6B:
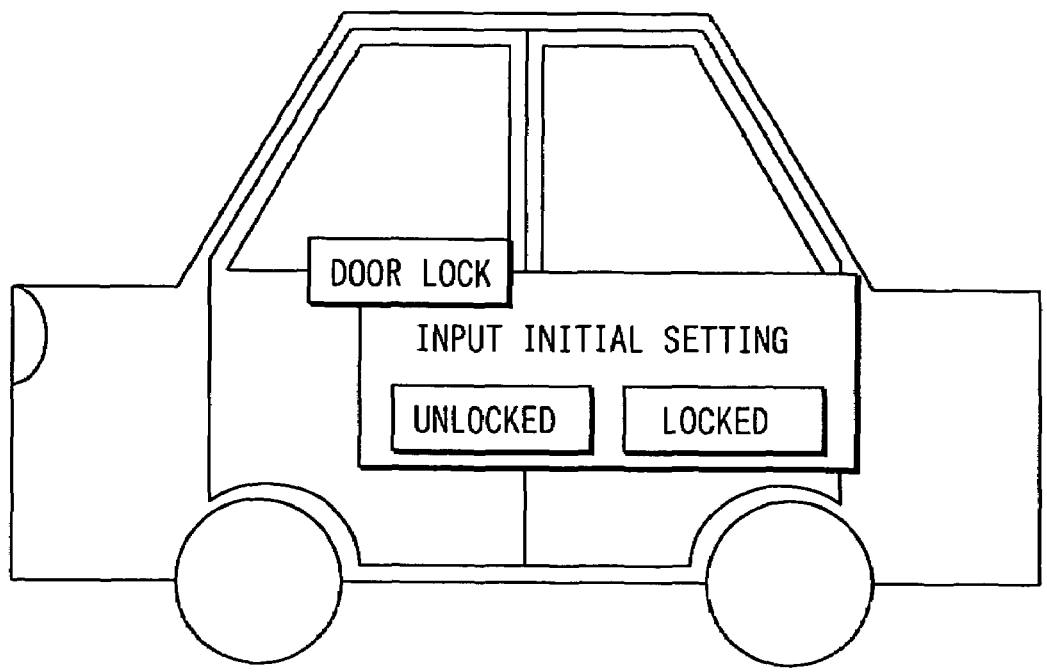
FIG. 6B is a pop up window appeared on the image for the initial setting arrangement.

A setting method of the initial setting is explained with reference to FIGS. 6A and 6B. FIGS. 6A and 6B are examples of images shown on a display in the operation panel 18. An instance of the initial setting is shown on the display as a side view of the vehicle 1 in FIG. 6A under an instruction from the touch switch or the like. The side view on the display with the touch switch allows the user to set the initial setting of the head lamp 31 when the head lamp portion 31 of the side view on the display is touched. Likewise, the window portion 32 allows the user to set the initial setting of the window 32 (open/closed), a door knob portion 33 for the initial setting of the door lock, the door portion 34 for the initial setting of the door (open/closed), and a center portion of a ceiling 35 for the initial setting of the internal lamp. Each of the windows, doors and door locks may be set individually. A trunk lid and/or a rear gate may be included in the initial setting settings.

A touch on the door knob portion 33 in FIG. 6A displays a pop up window for the initial setting shown in FIG. 6B. A press on a "Locked" button or an "Unlocked" button sets the initial setting of the door lock accordingly in the memory 12. A confirmation step may be taken by using another window that has a "Confirm" button after lock/unlock selection. An "Exclude" button may be displayed with the "Locked" and "Unlocked" button to exclude the initial setting of the door lock from comparison objects with the actual state.

An alternative way of setting the initial setting may be taken. For example, the initial setting may be set "as a whole" or "as is" instead of setting individually. That is, when the vehicle is parked in a condition that is desirable to be used as the initial setting, the desirable condition is set as the initial setting as it is. The user may use the touch switch on the operation panel 18 to display the pop up window for initial setting. The initial setting may be set by selecting a "collective setting" option to store a current condition of the vehicle in the memory 12 by using the switch/sensor 17 for detection of the current condition of windows, door locks and the like.

Figure 4:
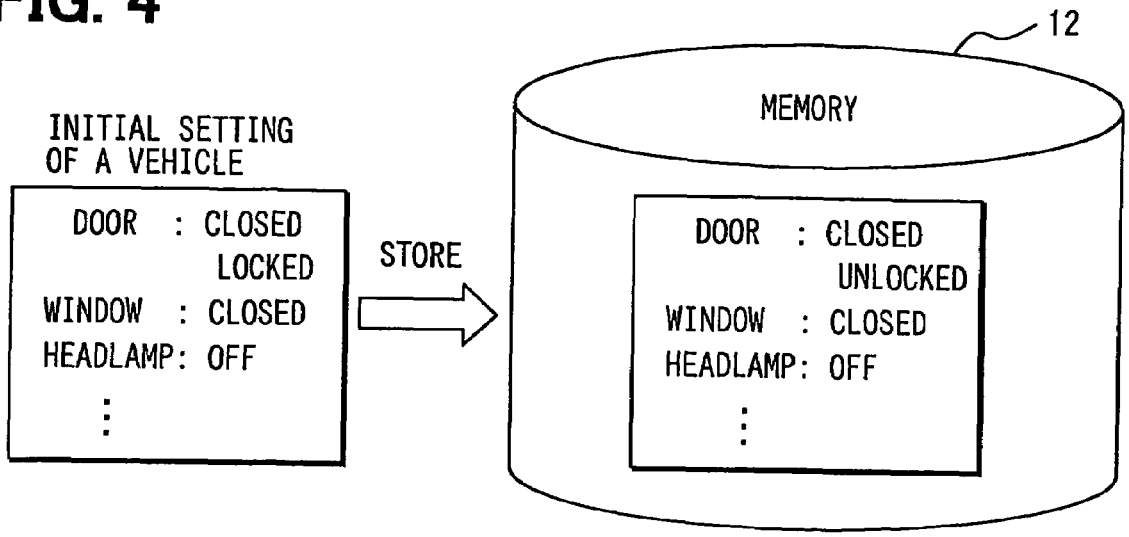
FIG. 4 is a block diagram of an initial setting stored in a memory.

An initial setting storage area in the memory 12 is shown in FIG. 4. The collective setting of the initial setting shown on the left is stored in the memory 12 by overwriting the initial setting on the right in the figure. In this case, the initial setting of the door lock "Unlocked" is overwritten to "Locked" and the initial setting of the door lock "Locked" is stored in the initial setting storage area.

Figure 7:
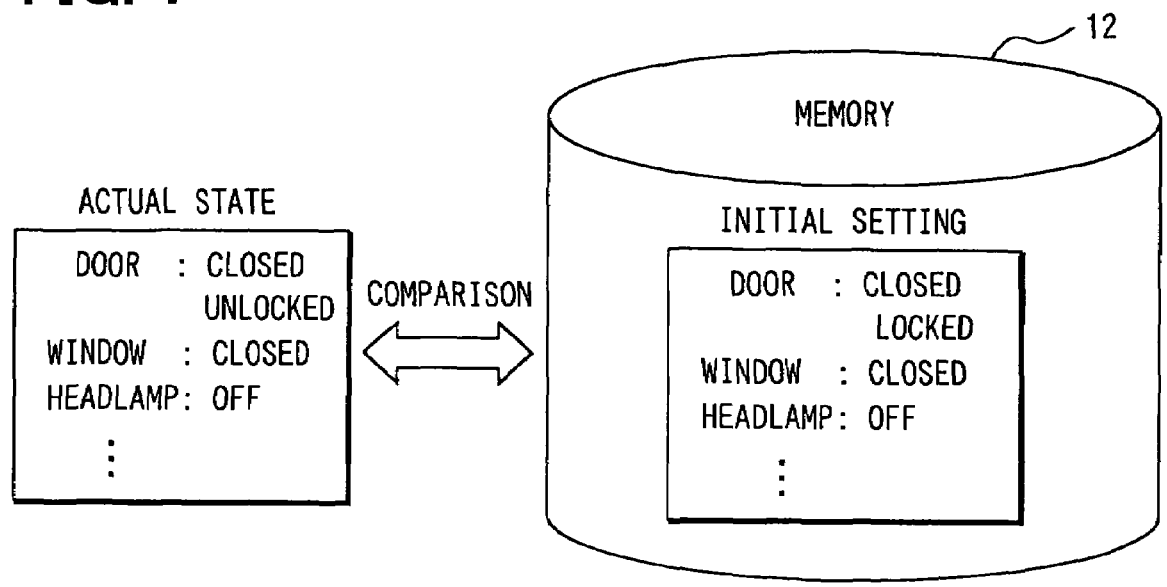
FIG. 7 is a block diagram of an initial setting compared to an actual state.

A reporting process of the vehicle 1 is explained. This reporting process is iteratively executed by the control program. The actual state, that is, a current condition of each of the sensors and switches in the switch/sensor 17 is stored in the RAM or the like of the ECU 11 temporarily. In FIG. 7, the door condition detection switch is "Closed," the door lock condition detection switch is "Unlocked," the window condition detection sensor is "Closed," and the lamp condition detection switch is "Head lamp OFF."

The detected condition of each of the switch/sensor 17 is compared with the initial setting. The initial setting of each component is, as shown in FIG. 7, that the door condition detection switch is "Closed," the door lock condition detection switch is "Locked," the window condition detection sensor is "Closed," and the lamp condition detection switch is "Head lamp OFF." In this case, the detected condition of the door lock "Unlocked" is different from the initial setting "Locked."

A reporting destination such as a telephone number of the portable device 3 (a cellular phone) or an E-mail address is stored in a predetermined area of the memory 12. The reporting destination is contacted when the initial setting of the vehicle 1 and the actual state are detected as different. A title and a message for the E-mail may be stored in the memory 12. The message of the E-mail may include a predetermined phrase such as, for example "Door is open," stored in the memory 12 to report a difference of the actual state from the initial setting to the user.

The detected condition of the door lock by the switch/sensor 17 is detected as different from the initial setting in this case. Therefore, the ECU 11 issues a warning, that is, the detected condition is different from the initial setting, to the predetermined reporting destination (i.e., the portable device 3) stored in the memory 12 by sending communication instruction to the data communication device 16 when the detected condition persists for a predetermined period of time (e.g., 30 minutes).

The period of time before sending the warning may be determined by the user of the vehicle 1. That is, the amount of time (i.e., a numerical value) may be input from the pop up window for the initial setting by the user by using the switch on the operation panel 18. The reporting destination may also be determined by the user. The reporting destination is input in the same manner as the predetermined time for the warning.

The reporting destination may be re-contacted repeatedly after a predetermined period of time for a predetermined number of times (e.g., 1 minute, 5 times) when the destination can not be reached because of a busy line or the like.

A user detection function either in the CPU or the peripheral circuit may be used to detect whereabouts of the user of the vehicle. The user detection function may send a warning to the user when the user is not detected in a proximity of the vehicle 1.

The user of the vehicle 1 is detected by using a response signal from the portable device 3 sent in response to a detection signal automatically sent from the data communication device 16. The user is determined not to be in the proximity of the vehicle 1 when the response signal is not received by the data communication device 16. A predetermined period of time, e.g., 30 minutes, is a threshold to determine that the user is absent from the vehicle. Then, the initial setting is compared with the actual state. The threshold time may be specified in the same manner as described above.

The initial setting may also be automatically set. That is, a condition of the vehicle after a predetermined period of time (e.g., 15 minutes) of vehicle engine stoppage by turning off the ignition switch may automatically be stored as the initial setting. The initial setting is detected by using the switch/sensor 17 in this case as in the other cases. Plural sets of initial settings may be stored in the memory 12 for determining the initial setting under majority rule.

The initial setting may be differentiated by incorporating time information derived from the CPU or the peripheral circuit (not shown in the figure) in the ECU 11 and/or location information derived from a Global Positioning System through a GPS receiver 19. That is used to accommodate different times (day/night etc.) and locations (office/home etc.) in the entries of the initial setting. The user of the vehicle may customize and store the plural initial settings in the memory 12 by, for example, specifying a location on a map displayed on the operation panel 18.

Figure 5:
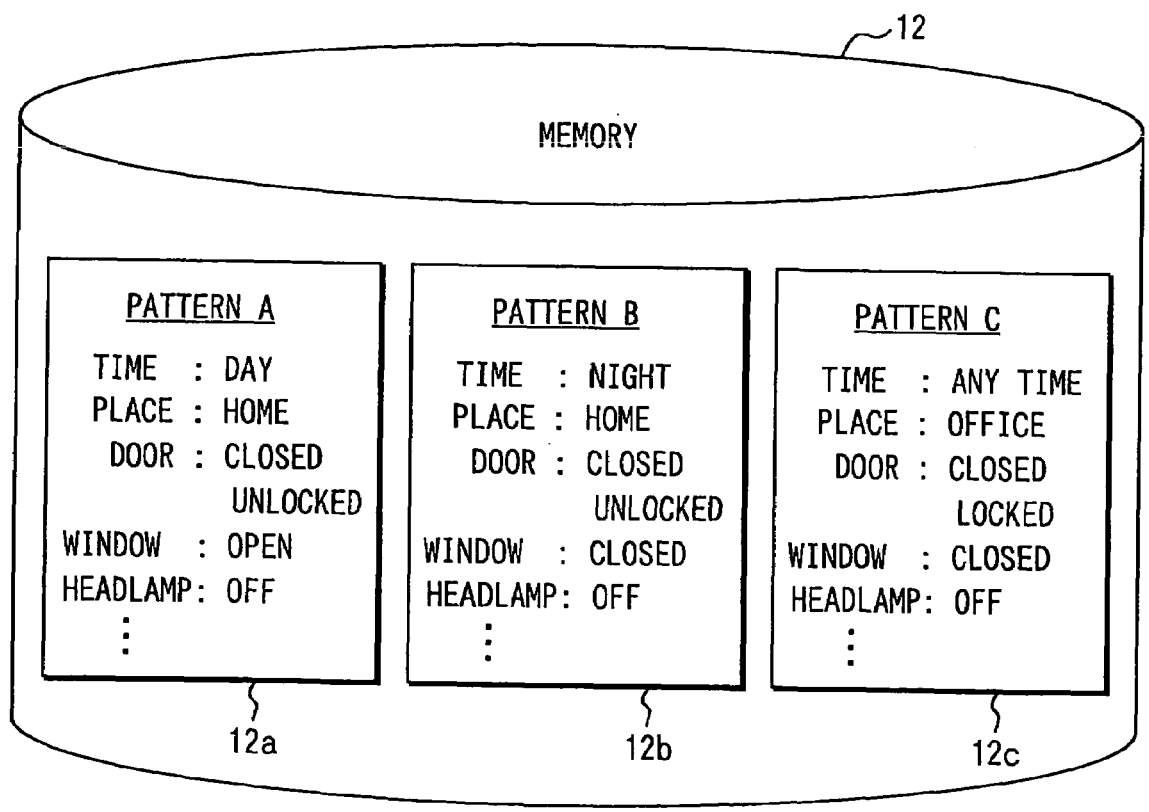
FIG. 5 is a modified example of the initial settings stored in the memory.

A part of the memory 12 is reserved as the initial setting storage area as shown in FIG. 5 for storing plural patterns of the initial setting. That is, a pattern A 12*a* is the initial setting for daytime, e.g., from 6 a.m. to 7 p.m. parking at home, a pattern B 12*b* is the initial setting for night, e.g., from 7 p.m. to 6 a.m. parking at home, and a pattern C 12*c* is the initial setting for parking at office regardless of the time slot. These patterns are stored in the memory 12 in the above-described manner as, for example, a setting 1 to setting 10. Each of the settings may have a specific name such as "home," "office," or the like instead of only having a number.

The memory 12 includes an area for storing a currently-used pattern of the initial setting. For example, the vehicle 1 uses the pattern A 12*a* when it is parked at home at 9 a.m. and the pattern A 12*a* is automatically switched to the pattern B 12*b* after 7 p.m. Further, the pattern A 12*a* is automatically switched to the patter C 12*c* upon receiving a current location from the GPS receiver 19 when the vehicle is moved from home to the office.

The current location may be derived from the GPS receiver 19 or the like in the ECU 11, or may be derived from a well-known type vehicle navigation system for showing a map and guiding a recommended route for the user of the vehicle. The vehicle condition monitoring system of the present invention may be integrated in a vehicle navigation system to decrease cost of production, because the navigation system in recent years accommodates various kinds of highly sophisticated functions including communication function with external network such as a cellular phone network or the like.

Second Embodiment

The initial setting of the vehicle may be set by using the portable device such as the cellular phone or the like. The portable device receives the warning when the actual state is different from the initial setting. The portable device and vehicle of this second embodiment may be represented by the portable device 3 and the vehicle 1 of the first embodiment illustrated in FIG. 1.

The portable device 3 may be used to set the initial setting of the vehicle 1 in this embodiment. An input window for the initial setting may be displayed on a display of the portable device by an input from a dial key or a function key of the portable device for allowing the user of the vehicle to specify the initial setting of the door (open/closed), the time slot for activating the initial setting, the place for activating the initial setting and the like. The initial setting may be sent to the automotive device on the vehicle 1 when, for example, a "Complete" button is pressed. The automotive device stores the initial setting received from the portable device 3 in a predetermined area of the memory 12. The initial setting may be set in the above-described manner with reference to FIG. 6.

The portable device 3 may store at least one initial setting of the vehicle 1 in a memory on the portable device 3, and the user of the vehicle 1 may select one of the initial setting stored in the portable device 3 to be sent and used on the vehicle 1. The vehicle 1 may store the initial setting in the initial setting storage area in the memory 12 for use in the vehicle condition monitoring system.

The vehicle 1 in this embodiment is assumed to have the same component function as the vehicle 1 in the first embodiment. Therefore, a detailed explanation of the vehicle 1 is omitted. Further, the operation panel 18 on the vehicle 1 may be omitted when all the setting operations and the like is sent from the portable device 3.

Third Embodiment

The portable device and the vehicle can be relayed by using a relay station. The vehicle 1, a relay station 2 and the portable device 3 in FIG. 1 collectively represent a scheme of this embodiment. The vehicle 1, the relay station 2 and the portable device 3 are communicatively connected through the wireless communication network. The portable device 3 in this embodiment is a well-known type cellular phone. The portable device 3 may also be a personal digital assistant (PDA), a transmitter of a wireless door lock having a reception function, or any other device that is equipped with a communication function.

First, the relay station 2 is explained. The relay station 2 includes an information server 25 and a transceiver 22 that exchanges data with the data communication device 16 on the vehicle 1.

Figure 3:
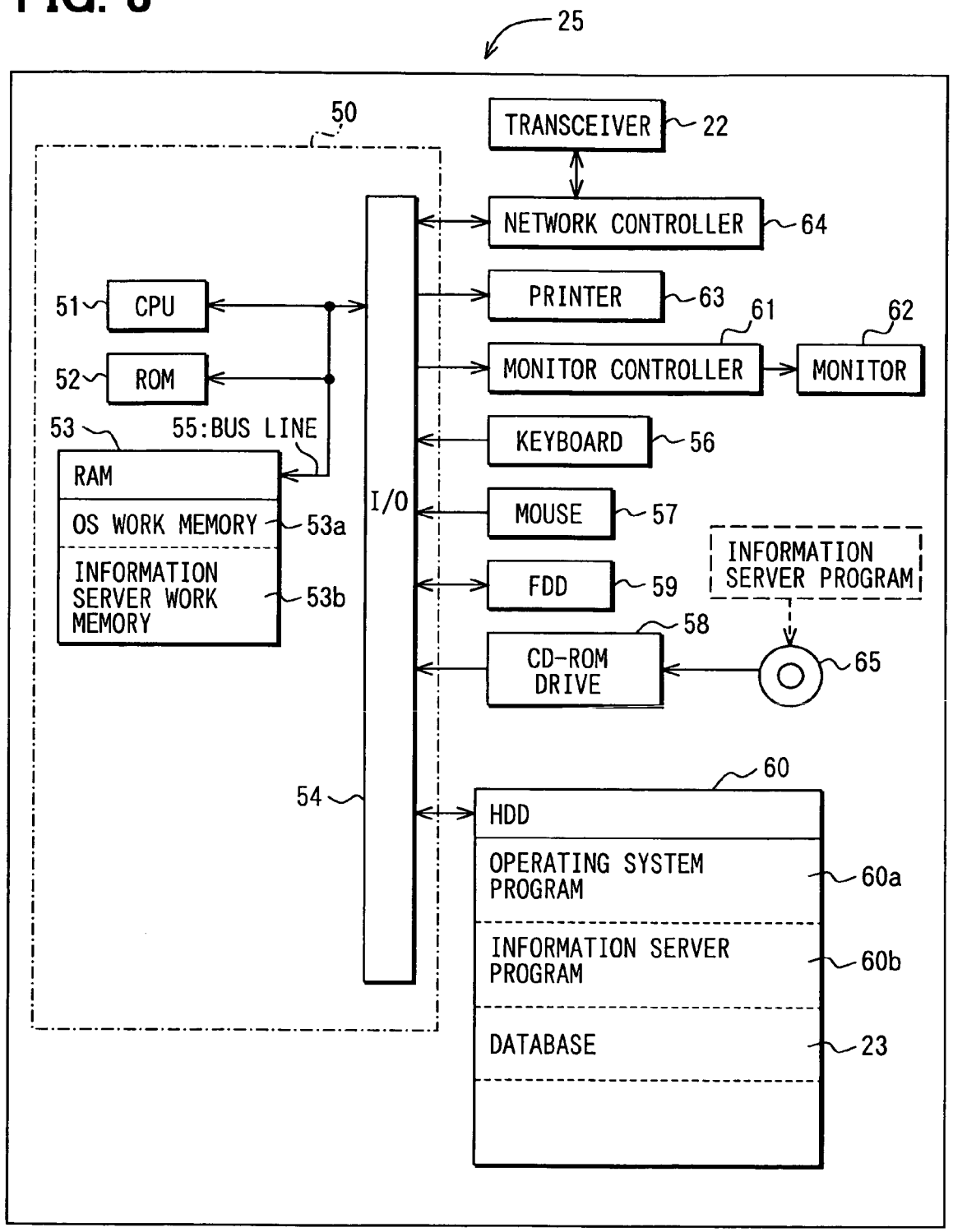
FIG. 3 is a block diagram of an information server.

An example of the information server 25 is shown in FIG. 3. The information server 25 includes a CPU 51, a ROM 52, a RAM 53 and an input/output interface (I/O) 54, collectively connected to the bus line 55, in a body 50. The information server 25 further includes the following parts, that is, input devices such as a keyboard 56, a mouse 57 and the like, recording media such as a CD-ROM drive 58, a Floppy (Registered trademark) disk drive (FDD) 59 or the like, a hard disk drive (HDD) 60, a monitor 62 with a monitor controller 61, a printer 63, and a network controller 64 for controlling a communication with the transceiver 22 and the like to server as a computer system.

The HDD 60 stores an operating system program (OS) 60a and an information server program 60b. The information server program 60b uses a work memory reserved on the RAM 53 by the OS 60a to implement a function of the information server 25. For example, the information server program 60b may be stored on a medium in the CD-ROM drive 58 or the like as a computer readable form to be installed on a predetermined area on the HDD 60. The RAM 53 may also serve as a work memory for the OS 60a.

The HDD 60 further includes a database 23 for storing a map data and a map related data (e.g., a weather information). The map related data may be updated regularly by an input data from the input devices such as the keyboard 56, the mouse 57 or the like, or may be updated by a retrieved data from the recording media such as the CD-ROM drive 58, the FDD 59 or the like. The map related data may not necessarily be limited to a weather information but include any information that can be used in the vehicle condition monitoring system of the present invention.

In this manner, the information server 25 serves as an information server when the information server program 60b is executed by the CPU 51 in the body 50 after an initialization process. Then, the vehicle 1 receives necessary information processed by the information server program 60b or a search result of the database 23 received through the transceiver 22 when vehicle 1 requests information or a search to the information server 25.

The initial setting of the vehicle 1 may be set by taking reference information available from the relay station 2 into account at the vehicle 1 or using the portable device 3. For example, a weather forecast is retrieved from the relay station 2 when the vehicle is parked outside for a night. The weather forecast is retrieved to the vehicle 1 or to the portable device 3 from the relay station 2 based on a location of the vehicle 1. The user of the vehicle 1 may prevent a rain from entering inside the vehicle 1 by changing the initial setting of the window to "Closed" from a normal setting of "Open" for ventilation, when the weather forecast retrieved to the vehicle 1 or to the portable device 3 foresees a rain of more than 1 mm within a couple of hours.

The relay station 2 may be used to relay a communication between the vehicle 1 and the portable device 3 when a direct communication between the vehicle 1 and the portable device 3 is not possible. That is, the database 23 stores addresses (e.g., a telephone number) of the vehicle 1 (i.e., the data communication device 16) and the portable device 3. For example, the vehicle 1 communicates with the portable device 3 by sending a request for address search to the database 23 through the relay station 2, and a request for calling the portable device 3 based on a retrieved address. The portable device 3 communicates with the vehicle 1 in the same manner.

The initial setting being set in the vehicle 1 or sent from the portable device 3 may be stored in the database 23 in the relay station 2. For example, the portable device 3 may change a necessary item in the initial setting retrieved from the database 23 and send the initial setting back to the relay station 2 and further to the vehicle 1 (the automotive device) to be stored in a predetermined area of the memory 12. In this manner, the memory 12 on the vehicle 1 may be reduced in size and the reduced size of the memory 12 may contribute to cost reduction.

The information server 25 may set the initial setting. In this case, the information server 25 provides an initial setting arrangement function, an initial setting auto-arrangement function and an initial setting storage function. The initial setting being set by the information server 25 is stored in the database 23 with a subject vehicle of the initial setting, and the initial setting is sent to the automotive device on the subject vehicle.

The vehicle 1 may register the initial setting in the relay station 2, and the relay station may regularly check the actual state of the vehicle 1. The relay station 2 may issue a warning to the portable device 3 when the actual state is different from the initial setting.

Fourth Embodiment

Figure 8:
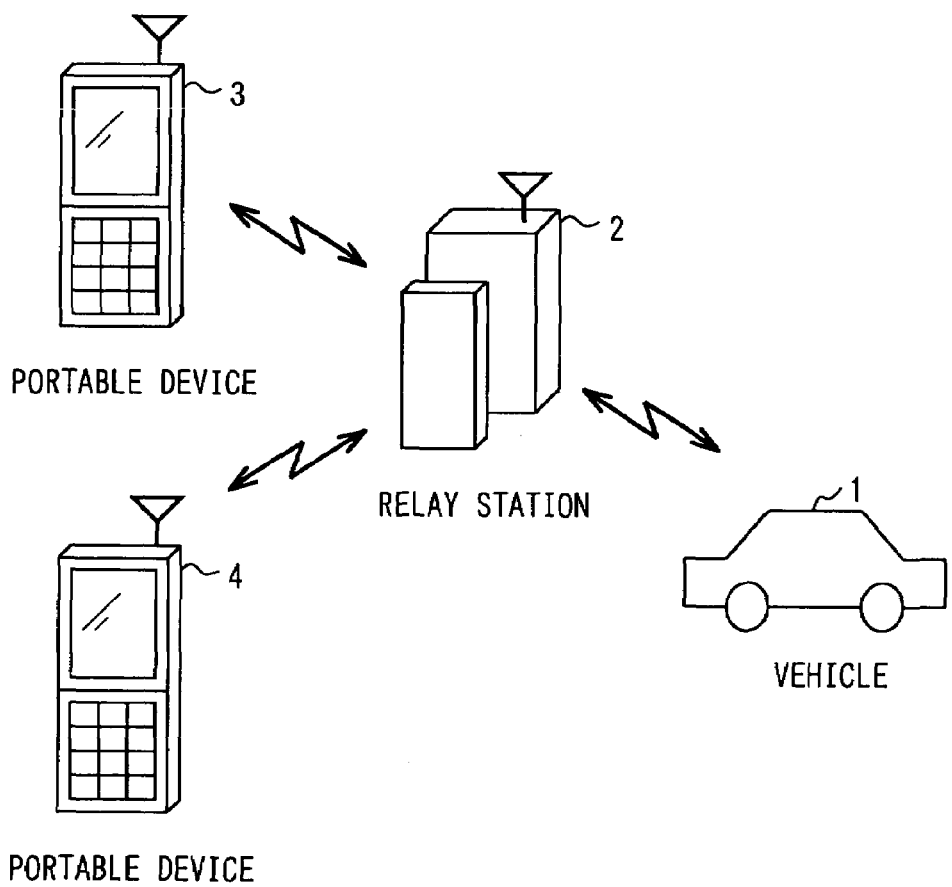
FIG. 8 is a schematic diagram that illustrates another embodiment of the vehicle condition monitoring system.

The vehicle condition monitoring system may use a plurality of portable devices. In this embodiment, the vehicle condition monitoring system is explained with reference to FIGS. 2, 8 and 9. As shown in FIG. 8, the vehicle 1, the relay station 2, the portable device 3 and the portable device 4 are connected to the wireless communication network. The portable devices 3, 4 in this embodiment are basically the cellular phones. However, the PDA, the transmitter of the wireless door lock, or any other communication device may substitute the cellular phones.

Figure 9:
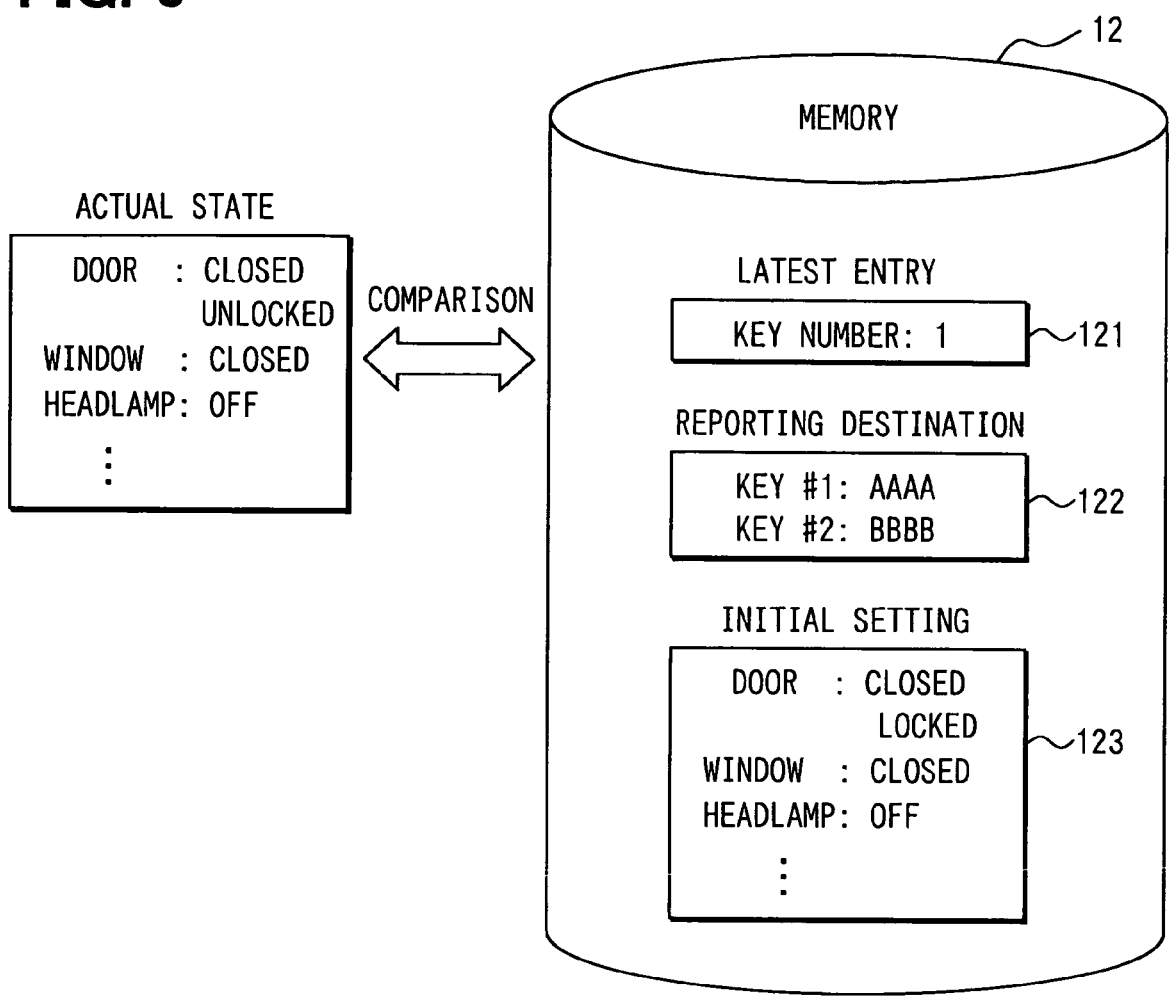
FIG. 9 is a block diagram of an initial setting compared to an actual state in a fourth embodiment.

The memory 12 includes a latest user storage area 121, a reporting destination storage area 122 beside an initial setting storage area 123, as shown in FIG. 9. The latest user storage area 121 stores a key number of the user who used the vehicle for the last time.

Figure 2:
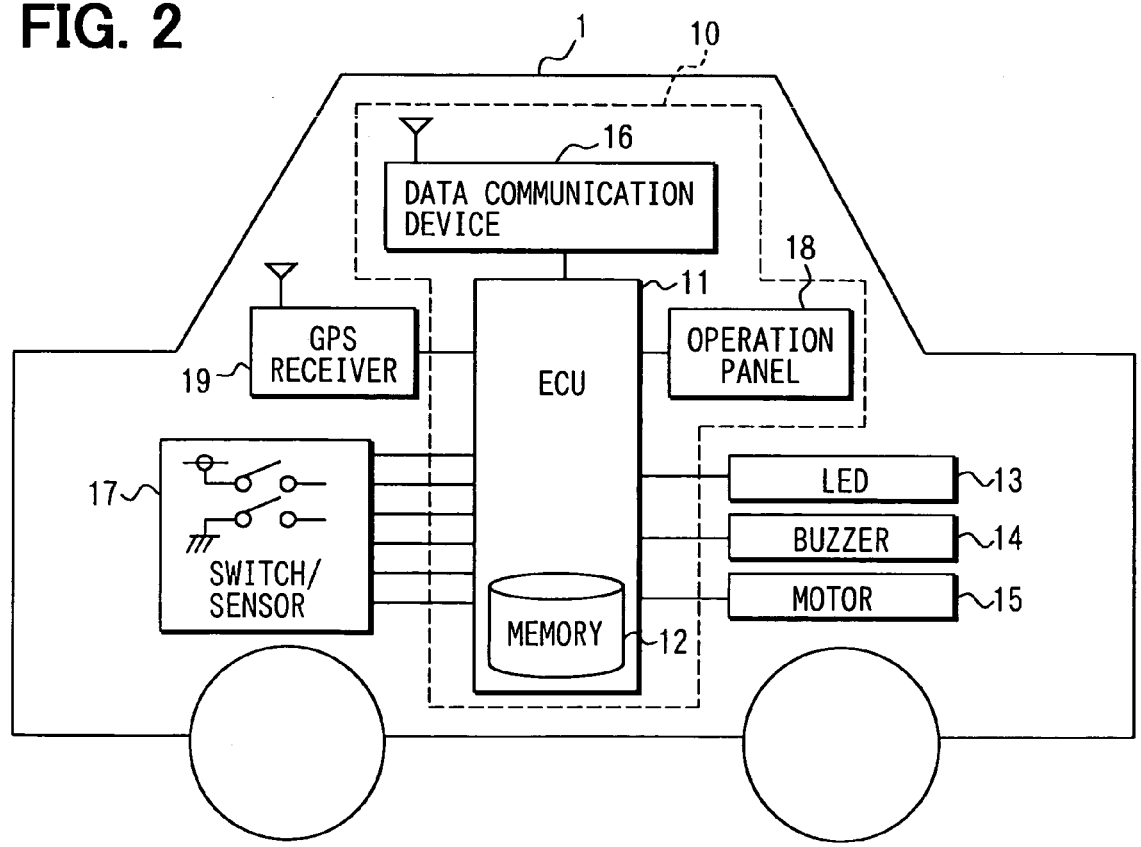
FIG. 2 is a block diagram of automotive devices of the vehicle condition monitoring system.

When the user uses the key to unlock the door, the ID information of the key, i.e., the key number, is transmitted to the automotive device 10 in FIG. 2. The data communication device 16 in the automotive device 10 stores the key number in the latest user storage area 121. The key number is 1 in the example shown in FIG. 9. That is, the latest user has the key of the key number 1.

The key number may be stored in the latest user storage area 121 in the following manner. That is, (1) the data communication device 16 may receive the key number when the door is locked, (2) the data communication device 16 may receive the key number when the engine is started, (3) the data communication device 16 may receive the key number when the engine is stopped, (4) the data communication device 16 may receive the key number when the trunk lid is opened after stopping the engine, (5) the data communication device 16 may receive the key number when all of the windows are closed after stopping the engine, or (6) the data communication device 16 may receive the key number when a predetermined action is taken besides the above-described actions. When plural key numbers are received, the smallest number may be stored in the storage area 121.

The reporting destination storage area 122 stores the reporting destination such as a telephone number, an E-mail address or the like corresponding to each key number. The example shown in FIG. 9 illustrates that the key number 1 corresponds to the portable device 3 having an address AAM and the key number 2 corresponds to the portable device 4 having an address BBBB. In addition, plural keys may correspond to a single reporting destination.

The actual state of each switch/sensor detected by the switch/sensor 17 and the initial setting in the initial setting storage area 123 is different in FIG. 9. That is, the actual state of the door lock is "Unlocked" against the stored initial setting "Locked." Therefore, the ECU 11 determines that the actual state of the vehicle 1 is a negligent "Unlocked" condition, and sends a warning by retrieving a content of the latest user storage area 121 (key number 1) and informing the reporting destination corresponding to the key number 1 (the portable device 3 having the address AAMA) that the vehicle 1 is in different condition from the initial setting.

The warning may only be sent to the latest user storage area 121, or may be sent to the other entry in the reporting destination storage area 122 subsequently after sending the warning to the latest user.

The key may be a wireless key of a well-known type, or may be a key to be inserted to a key cylinder, a smart key for a keyless entry system, or the like. The key may be integrally formed with the portable devices 3, 4. In this embodiment, the number of the keys may be one.

Like numbers in this embodiment indicate like components, operations or controls in the previous embodiments.

Fifth Embodiment

Another embodiment that uses plural keys and plural portable devices is explained with reference to FIGS. 8 and 10.

Figure 10:
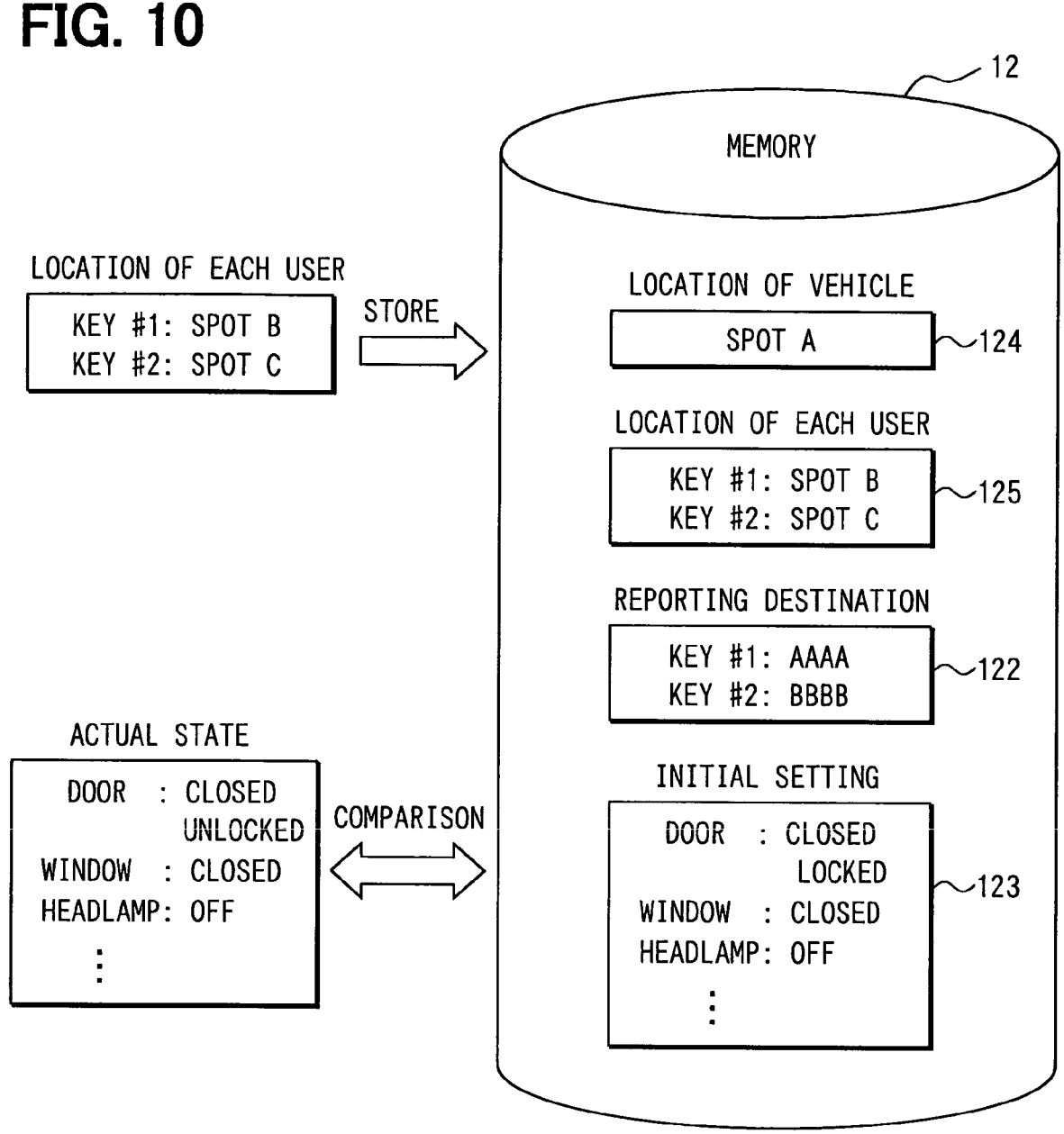
FIG. 10 is a block diagram of an initial setting compared to an actual state in a fifth embodiment.

FIG. 10 shows the memory 12 including the initial setting storing area 123, a current vehicle location storage area 124, a user location storage area 125 and the reporting destination storage area 122. The vehicle 1 receives a signal from a Global Positioning System satellite to determine a current vehicle location by using the GPS receiver 19 shown in FIG. 2. The current vehicle location may also be detected by using an earth magnetism sensor, a gyroscope, a distance sensor, a steering rotation sensor and/or a tire rotation sensor. The automotive device 10 may be connected to the navigation system (not shown in the figure) to obtain the current vehicle location.

The reporting destination storage area 122 stores reporting destinations (telephone numbers, E-mail addresses or the like) that correspond to the key numbers. The example shown in FIG. 9 illustrates that the key number 1 corresponds to the portable device 3 having an address AAAA, and the key number 2 corresponds to the portable device 4 having an address BBBB. In addition, plural keys may correspond to a single reporting destination.

The portable devices 3, 4 include a location detector to detect a current location of the devices 3, 4, and regularly communicate with the automotive device 10 to send the current location to the device 10. The automotive device 10 stores received location information in the user location storage area 125. The relay station 2 may also query the portable devices 3, 4 for current locations to obtain and send the current user locations to the vehicle.

The actual state of the each switch/sensor detected by the switch/sensor 17 is compared with the initial setting stored in the initial setting storage area 123 in FIG. 10. In this case, the actual state of the door lock "Unlocked" is different from the initial setting "Locked." Therefore, the ECU 11 determines that the actual state of the vehicle 1 is the negligent "Unlocked" condition, and calculates distances between the current location of the vehicle and each of the current location of the portable devices 3 and 4 by using the current vehicle location in the current vehicle location storage area 124 and the current location of the users having the portable devices 3, 4 in the user location storage area.

The user closest to the vehicle 1 is selected based on the comparison of the distance calculated in the above-described manner. The warning that the vehicle 1 is different from the initial setting is sent to the address of the portable device 4 (key number 2: address BBBB) stored in the reporting destination storage area 122 as shown in the example shown in FIG. 10.

Only the user closest to the vehicle may be notified by the abnormal signal, or the other users may be included in the reporting destination in order of the calculated distance from the vehicle.

Further, the key (not shown in the figure) may include the location detector and the communication system to regularly report the current location of the key to the automotive device 10. The key may also be integrally formed with the portable devices 3, 4. The only one key may be sufficient to operate the vehicle condition monitoring system.

Like numbers in this embodiment indicate like components, operations or controls in the previous embodiments.

Although the present invention has been fully described in connection with the preferred embodiments thereof with reference to the accompanying drawings, it is to be noted that various changes and modifications will become apparent to those skilled in the art.

What is claimed is:
1. A vehicle condition monitoring system for monitoring a state of a vehicle in an unattended condition comprising:
   an initial setting storage means for storing an initial setting including at least one of a window setting, a light setting and a door lock setting of the vehicle in the unattended condition;

an actual state detection means for detecting an actual state of the vehicle in the unattended condition;

a comparison means for comparing the initial setting and the actual state of the vehicle;

a reporting means for issuing a report that identifies the existence of a difference between the actual state of the vehicle and the initial setting;

a portable device for receiving the report through a wireless communication system; and a time keeping means for keeping time that the vehicle is left in the unattended condition, wherein the reporting means issues the report when a predetermined amount of time has elapsed after the vehicle has been left in the unattended condition.

2. The vehicle condition monitoring system of claim 1 further comprising, a vehicle user detection means for detecting the presence of a user within a proximity of the vehicle, wherein the reporting means issues the report when the vehicle user detection means does not detect the user in the proximity of the vehicle.

3. The vehicle condition monitoring system of claim 1 further comprising:

an initial setting arrangement means for enabling the user to arrange the initial setting of the vehicle, wherein the initial setting arranged by the initial setting arrangement means is stored in the initial setting storage means.

4. The vehicle condition monitoring system of claim 3, wherein the initial setting arrangement means operates in one of an automotive device on the vehicle, the portable device and a relay station in the wireless communication system.

5. The vehicle condition monitoring system of claim 3, wherein the initial setting arrangement means and the actual state detection means operate in an automotive device on the vehicle.

6. The vehicle condition monitoring system of claim 3, wherein the initial setting of the vehicle stored in the initial setting storage means includes an activation time for operating the vehicle condition monitoring system, and the initial setting of the vehicle is used by the vehicle condition monitoring system during the activation time.

7. The vehicle condition monitoring system of claim 1 further comprising:

an actual state storage means for storing the actual state of the vehicle; and an initial setting auto-arrangement means for automatically arranging the initial setting of the vehicle based on the actual state stored by the actual state storage means, wherein the initial setting of the vehicle automatically arranged by the initial setting auto-arrangement means is stored in the initial setting storage means.

8. The vehicle condition monitoring system of claim 1 further comprising:

a location detection means for detecting a location of the vehicle, wherein the initial setting stored in the initial setting storage means includes the location detected by the location detection means, and the initial setting is used when a current location of the vehicle and the location stored in the initial setting are substantially the same.

9. The vehicle condition monitoring system of claim 1 further comprising:

a plurality of lock means for locking and unlocking a door on the vehicle;

a lock ID storage means for storing a lock ID of the lock means;

a lock ID transfer means for transferring the lock ID to an automotive device;

a lock ID reception means on an automotive device for receiving the lock ID;

a portable device ID number storage means for storing an ID number of the portable device; and a portable device selection means for selecting the portable device from a plurality of portable devices to receive the report, wherein the reporting means issues the report to the portable device selected by the portable device selection means, the report being based on the lock ID received by the lock ID reception means.

10. The vehicle condition monitoring system of claim 9 further comprising:

a recording means for recording the lock ID being used in the vehicle, wherein the lock ID includes one entry in a list of a plurality of lock ID's, the portable device selection means selects the portable device that corresponds to a latest entry in the list of the plurality of the lock ID's in the recording means, and the reporting means issues the report to the portable device selected by the portable device selection means.

11. The vehicle condition monitoring system of claim 9 further comprising:

a portable device location detection means for detecting a location of the portable device;

a location retrieval means for retrieving a location of the portable device detected by the portable device location detection means;

a location storage means for storing the location of the portable device retrieved by the location retrieval means; and a distance calculation means for calculating a distance between the portable device and the vehicle, wherein the portable device selection means selects the portable device that is closest to the vehicle, and the reporting means issues the report to the portable device selected by the portable device selection means.

12. The vehicle condition monitoring system of claim 1, wherein the vehicle is parked when the vehicle is in the unattended condition, and the vehicle is not in the unattended condition if the vehicle is not parked.

13. The vehicle condition monitoring system of claim 1, wherein the vehicle has been left in the unattended condition when the vehicle engine is stopped by turning off an ignition switch of the vehicle.

14. The vehicle condition monitoring system of claim 1, wherein the wireless communication system is a wireless communication network, and the portable device includes a transceiver and is adapted for communication with the wireless communication network.

15. The vehicle condition monitoring system of claim 1, wherein the initial setting includes each of the window setting, the light setting and the door lock setting.

16. A vehicle condition monitoring system for monitoring a state of a vehicle in an unattended condition comprising:

a portable device configured for receiving a report through a wireless communication system; and in the vehicle, an initial setting storage configured to store an initial setting including a window setting, a light setting and a door lock setting of the vehicle in the unattended condition;
actual state detection sensors for detecting an actual state of the vehicle in the unattended condition;
a vehicle user detection device configured to detect the presence of a user within a proximity of the vehicle;
a location detection device configured to detect a location of the vehicle;
a processor, operably connected to the initial setting storage, the actual state detection sensors, the vehicle user detection device, and the location detection device,
wherein the processor is configured for comparing the initial setting and the actual state of the vehicle; transmitting a report that identifies the existence of a difference between the actual state of the vehicle and the initial setting; keeping time that the vehicle is left in the unattended condition; and enabling the user to arrange the initial setting of the vehicle;
wherein the processor transmits the report if all of the following occur: a predetermined amount of time has elapsed after the vehicle has been left in the unattended condition the vehicle user detection means does not detect the user in the proximity of the vehicle, and the actual state of the vehicle differs from the initial setting;
wherein the initial setting arranged by the processor is stored in tube initial setting storage,
wherein the vehicle has been left in the unattended condition when the vehicle engine is stopped by turning off an ignition switch of the vehicle.

17. The vehicle condition monitoring system of claim 16 further comprising:
a plurality of lock means for locking and unlocking a door on the vehicle;
a lock ID storage means for storing a lock ID of the lock means;
a lock ID transfer means for transferring the lock ID to an automotive device;
a lock ID reception means on an automotive device for receiving the lock ID;
a portable device ID number storage means for storing an ID number of the portable device; and
a portable device selection means for selecting the portable device from a plurality of portable devices to receive the report,
wherein the processor transmits the report to the portable device selected by the portable device selection means, the report being based on the lock ID received by the lock ID reception means.

18. The vehicle condition monitoring system of claim 17 further comprising:
a portable device location detection means for detecting a location of the portable device;
a location retrieval means for retrieving a location of the portable device detected by the portable device location detection means;
a location storage means for storing the location of the portable device retrieved by the location retrieval means; and
a distance calculation means for calculating a distance between the portable device and the vehicle,
wherein the portable device selection means selects the portable device that is closest to the vehicle, and the processor transmits the report to the portable device selected by the portable device selection means.

* * * * *